United States Patent Office 3,404,016
Patented Oct. 1, 1968

3,404,016
MAGNESIA REFRACTORY AND METHOD OF
PRODUCING SAME
Henry L. Marschall, Palo Alto, Calif., assignor to
FMC Corporation, New York, N.Y., a corporation of Delaware
No Drawing. Continuation-in-part of application Ser. No. 454,656, May 10, 1965. This application Mar. 2, 1966, Ser. No. 531,050
9 Claims. (Cl. 106—60)

ABSTRACT OF THE DISCLOSURE

A magnesia refractory having an increased resistance to erosion and spalling is produced by mixing together magnesium oxide or magnesium hydroxide, silica and ferrophosphorus sufficient to supply from about 1% to about 6% by weight of iron, expressed as $Fe_2O_3$, and firing this mixture to temperatures on the order of about 1600° to 1900° C. for a time sufficient to produce a sintered periclase containing about 80 to 95% MgO.

---

This application is a continuation-in-part of U.S. application Ser. No. 454,656, now abandoned, filed May 10, 1965 in the name of the present inventor.

The present invention is concerned with the production of a refractory composition, and especially to refractory compositions containing a major proportion of magnesium oxide (magnesia) and a minor proportion of iron.

In the construction of high-temperature furnaces employed in the production of iron and steel, it is customary to employ a refractory lining resistant to the high-temperatures utilized in the operations of these furnaces. Frequently, refractory liners are made up of synthetic periclase which is produced by sintering either magnesia or sea water-derived magnesium hydroxide sludges at temperatures of from about 1600° to 1900° C. Magnesium hydroxide sludges may be obtained from sea water by the process described in U.S. Patent 2,703,273 granted to James A. Robertson et al. on Mar. 1, 1955.

Magnesium oxide is ideal for refractory use because of its high melting point, i.e., about 2800° C. One of the difficulties with pure magnesium oxide per se is that it does not sinter or bond into adherent masses which can be used in the makeup of refractory liners. To overcome this objection numerous sintering agents have been added to the magnesium oxide. One of the most common additives is iron, particularly when added in amounts of about 3% or above, expressed as iron oxide. This additive, particularly in the presence of about 2–4% silica, increases the bulk density of the magnesia and permits good sintering of the magnesia at temperatures of about 1800° C.

One common difficulty encountered in using iron-containing, magnesium oxide refractories is that the furnace slag attacks the refractory causing spalling which increases erosion and breakdown. The spalling is brought about by slag penetrating the pores of the refractory and breaking off layers of the refractory at the slag interface. Such spalling is highly undesirable since it causes rapid erosion of the refractory liner and greatly diminishes its life in the furnace.

It has been desired to produce a magnesia refractory which has good resistance to spalling and erosion when used as the refractory surface in steel furnaces and which therefore has a longer furnace life and requires fewer furnace shutdowns for replacement of the refractory liner.

I have found that a magnesia refractory having increased resistance to erosion and spalling can be produced by mixing together from about 80% to about 95% by weight of magnesium oxide (or equivalent magnesium hydroxide), from about 1% to about 6% by weight of silica, and an amount of a ferrophosphorus fraction from a phosphorus-producing electric furnace sufficient to supply from about 1% to about 6% by weight of iron, expressed as $Fe_2O_3$, and firing the mixture to temperatures on the order of about 1600° to 1900° C. for a time sufficient to produce a sintered periclase having a porosity of below about 15%.

I have found further that the ferrophosphorus additive results in obtaining a periclase having a porosity of below about 15% even when the silica content in the periclase is very low, i.e., below about 3%.

More specifically, the present invention is based on the discovery that the addition of ferrophosphorus to magnesia results in an improved periclase having much greater resistance to attack by molten iron and slag than is obtained by mere iron oxide addition. The resultant periclase grain can be used in making refractory bricks, or refractory ramming and gunning mixes that yield a refractory having a much longer life. The mechanism by which the added ferrophosphorus improves the refractory's life is not known.

In carrying out the present process the magnesia can be obtained by mining ores such as magnesite or from brine solutions. Brines such as sea water or bitterns containing economically recoverable quantities of magnesium ions can be used to supply the magnesia. The bitterns are the supernatant mother liquors which remain after a portion of the sea water has been evaporated in the process of recovering ordinary salt. Bitterns are preferred because of the high concentration of magnesium present in the solution. While sea water and bitterns are the brines having the most likely source of magnesium ion, it should be appreciated that any solution of soluble magnesium salts containing recoverable quantities of magnesium ion can be utilized for this purpose, including brines derived from underground deposits of soluble magnesium salts.

The magnesium ion which is present in the solution of bitterns is separated as insoluble magnesium hydroxide by adding a lime to the solution. This procedure is fully described in U.S. Patent 2,124,002, issued to Mastin on July 19, 1938. Precipitating agents such as lime or calcined dolomitic materials (dolime) may be employed in the present process to produce insoluble magnesium hydroxide.

In one embodiment of the invention the magnesium hydroxide sludge thus precipitated is employed as the feed to a rotary kiln. The desired amount of silica and iron (as ferrophosphorus) is added to the sludge and the resulting mixture is heated in the kiln. In the case of a rotary kiln, the mixture is agitated by the rotary motion of the kiln. In other types of kilns some provision for mixing and agitation of the mixture should be provided to maintain a uniform mixture.

As the resulting mixture is heated in the kiln to temperatures above 100° C., any free water is driven off and the resultant mixture is converted to fragile masses. When these masses are heated above about 450° C., the magnesium hydroxide is converted to magnesium oxide. Thereafter, heating is continued up to temperatures of about 1200° C. During this heating stage the magnesium oxide mixture forms hard spheres by agglomeration of the magnesium oxide and other additive particles. In some cases, it may be desirable to add previously sintered periclase nodules with the feed in order for the feed particles to agglomerate on the surface of these nodules which serve as seed nuclei. At a temperature of about 1200° C. these particles have agglomerated into porous, hard nodules. The resulting nodules are then sintered at progressively higher temperatures up to about 1900° C.

In another embodiment of the invention magnesite, essentially $MgCO_3$, is calcined to temperatures of about 800° C. to 1000° C. until a light-burned MgO is obtained. The required amount of silica and iron (as ferrophosphorus) is then added to the light-burned MgO and the resulting mixture is sintered at progressively higher temperatures up to 1900° C. If desired, the silica and iron (as ferrophosphorus) can be added along with the magnesite feed to the kiln, and the resulting mixture sintered in one operation.

In the make-up of the instant refractory, the iron content of the refractory, ranging from about 1% to about 6% by weight, expressed as iron oxide, is obtained by adding a ferrophosphorus fraction from a phosphorus-producing electric furnace to the magnesium oxide. The ferrophosphorus fraction contains principally iron and phosphorus with minor amounts of vanadium, chromium and silica. All of these minor ingredients are present as iron alloys and not in the uncombined or mineral state. In general, a typical ferrophosphorus fraction contains the following ingredients (expressed as the uncombined compound):

| | Percent |
|---|---|
| Iron | 50–70 |
| Phosphorus | 19–29 |
| Vanadium | 4–5 |
| Chromium | 3.5–5.5 |
| Silica ($SiO_2$) | 0.1–8 |

The desired silica content of the periclase is normally obtained by adding fine sand to the kiln mix before firing. However, since the added ferrophosphorus normally contains silica the ferrophosphorus fraction supplies at least a portion of the required silica. If a very low silica periclase is desired, the bulk or all of the required silica can be supplied by employing ferrophosphorus having a high silica content without the need for adding sand to the mix.

In the present process the addition of the ferrophosphorus to supply the iron additive is helpful in reducing the porosity of the sintered magnesium oxide product. This is particularly important where very low amounts of silica, i.e., below about 3%, are used. Silica acts as a liquid flux during the sintering step which penetrates the magnesium oxide agglomerate and aids in shrinking the sphere, thereby reducing the porosity. This same property of silica, however, is detrimental in the end-use of the refractory, because it lowers the melting point and shortens refractory life. Thus, it is desirable to keep silica at a minimum. In the absence of silica or other additives, such as ferrophosphorus, porosities higher than 15%, which is the desirable maximum porosity permitted for this application, are obtained in this process. The ferrophosphorus additive reduces the porosity of the magnesia product even when low amounts of silica, i.e., below about 3% $SiO_2$, are used and keeps the porosity of the resultant product below about 15%.

Table I illustrates the ranges of iron and phosphorus which are present in the final periclase when ferrophosphorus additives were employed having different Fe/P ratios.

TABLE I

| | Ferrophosphorus sample No. | | | |
|---|---|---|---|---|
| | 1 | 2 | 3 | 4 |
| Fe/P ratio of ferrophosphorus | 2.29 | 2.59 | 2.71 | 2.43 |
| Wt. percent of Fe added (as $Fe_2O_3$) | 1–6 | 1–6 | 1–6 | 1–6 |
| Wt. percent of P as $P_2O_5$ | 0.700–4.20 | 0.619–3.72 | 0.592–3.55 | 0.660–3.93 |

A typical analysis of the magnesia produced by the present process (expressed as the oxides) is as follows:

| | Percent |
|---|---|
| MgO | 89–92 |
| $Fe_2O_3$ | 3.3–3.8 |
| $SiO_2$ | 2.2–2.7 |
| $P_2O_5$ | 2.0–2.5 |

Typical refractory compositions may contain from about 80 to 95% MgO (preferably about 89 to 92% MgO), about 1.5% to about 4.5% iron (preferably about 3.3% to about 3.8% iron), expressed as $Fe_2O_3$, about 1.5% to about 4.5% $SiO_2$ (preferably about 2.2 to 2.7%) and about 0.5% to about 5% $P_2O_5$ (preferably about 2.0 to 2.5% $P_2O_5$), wherein the ratio of Fe/P is at least 2.29.

The following examples are given to illustrate the present invention and are not deemed to be limiting thereof.

EXAMPLE 1

Run A—Process of present invention

A periclase mixture was made up by blending an appropriate amount of bittern-derived, lightburned magnesium oxide, milled sand, calcium carbonate, and a ferrophosphorus fraction derived from a phosphorus-producing electric furnace to yield a final product containing about 2.5% $SiO_2$, 2.5% $Fe_2O_3$, 1.0% CaO, and 1.7% $P_2O_5$. The lightburned magnesia was obtained by precipitating magnesium hydroxide from bittern with dolime and washing, filtering and heating the magnesium hydroxide slurry to obtain magnesium oxide. The resultant lightburned magnesium oxide contained 97% MgO, 0.9% $SiO_2$, 0.7% CaO, 0.2% $Fe_2O_3$, and some amounts of trace impurities, on an ignited basis.

A 75-pound charge of this mixture was added to a pilot rotary calciner along with 25 pounds of periclase seed and 0.5 pound of NcCl. The resultant mixture was heated to 1200° C. in order to densify and nodulize the mixture. The nodulized mixture was chipped from the surface of the periclase seeds, placed in a furnace and sintered at 1800° C. for one hour. The ferrophosphorus fraction that was used to supply the iron contained, on analysis, the following weight percentages of materials:

| | Percent |
|---|---|
| Fe (83% $Fe_2O_3$) | 58 |
| P (62% $P_2O_5$) | 27 |
| V (9% $V_2O_5$) | 5 |
| Cr (7% $Cr_2O_3$) | 5 |
| Si (4% $SiO_2$) | 2 |
| Ni (1% NiO) | 1 |

The resultant sintered product was removed from the furnace, cooled, ground to −100 mesh size, and found to have the following analysis:

| | Percent by wt. |
|---|---|
| $SiO_2$ | 3.4 |
| $Fe_2O_3$ | 2.3 |
| CaO | 1.2 |
| $P_2O_5$ | 1.2 |
| MgO (by difference) | 91.9 |

The porosity of the material was found to be 14% by volume as measured by mercury displacement.

The above process was repeated with a second sample except that the iron was supplied by using a pyrite cinder essentially $Fe_2O_3$. The final periclase product contained by weight 3.7% $SiO_2$, 2.5% $Fe_2O_3$, 1.8% CaO, 0.09% $P_2O_5$, 91.9% MgO (by difference) and had a porosity of 18% by volume.

EXAMPLE 2

Run A.—Process of present invention

A run was carried out using the same technique as specified in Example 1, Run A, except that larger amounts of ferrophosphorus were used in the formulation. The final product contained, by weight, 2.2% $SiO_2$, 3.5% $Fe_2O_3$, 0.8% CaO, 1.7% $P_2O_5$, 91.8% MgO (by difference) and had a porosity of 11.5% by volume.

A sample of this composition, prepared in a continuous rotary kiln, was crushed and mixed with inorganic binders and used as a gunning mix to form the interior refractory linings of tap holes in open hearth steel furnaces. A number of heats were run through these tap holes until the linings showed sufficient wear as to require replacement of the gunning mix. It was found that the refractory surface of the tap hole withstood an average of 22 heats after 14 field tests.

Run B.—Prior art process

The process of Run A was repeated except that the iron was supplied by using a pyrite cinder, essentially $Fe_2O_3$. Pyrite cinder is the residue left after iron pyrites are burned in air to yield sulfur oxides. The final periclase product contained, by weight, 2.6% $SiO_2$, 2.3% $Fe_2O_3$, 1.3% CaO, 0.09% $P_2O_5$, 93.7% MgO (by difference) and had a porosity of 26% by volume.

A sample of this composition, prepared in a continuous rotary kiln, was crushed and mixed with the same inorganic binders specified in Run A. The mixture was used as a gunning mix to coat interior refractory lining of tap holes in open hearth steel furnaces. This gunning mix required replacement after the number of heats run through the tap holes reached an average of 9 heats after 14 field tests.

EXAMPLE 3

The process of Example 2, Run A, was repeated using an equivalent amount of magnesium hydroxide in place of magnesium oxide and was carried out in a heated, continuous rotary kiln. Substantially equivalent results were obtained as in Example 2, Run A.

As will be observed by comparing Run A and Run B of Example 2, when iron is added to the periclase in the form of iron oxide (Run B), the resulting product does not have the high resistance to spalling, erosion and refractory breakdown which is exhibited by the periclase made in Run A, wherein the iron is supplied by a ferrophosphorus fraction. Further, the present process can be operated using either magnesium oxide or magnesium hydroxide as the magnesia source as shown in Examples 2 and 3.

EXAMPLE 4

Run A.—Process of present invention

A periclase mixture was made up by blending an appropriate amount of magnesite-derived, lightburned magnesium oxide, milled silica, and a ferrophosphorus fraction derived from a phosphorus-producing electric furnace, to yield a final product containing about 2.7% $SiO_2$, 3.5% $Fe_2O_3$, 1.5% CaO and 2.2% $P_2O_5$. The lightburned magnesia was obtained by calcining magnesite ore in a Herreshoff furnace. The resultant lightburned magnesium oxide contained 97% MgO, 0.6% $SiO_2$, 1.6% CaO, 0.5% $Fe_2O_3$ and some amounts of trace impurities, on an ignited basis.

The 5 g. cylindrical pellets of this periclase mixture were formed by pressing at 735 p.s.i. The pellets were then placed in a furance and sintered at 1800° C. for one hour. The ferrophosphorus fraction that was used to supply the iron contained, on analysis, the following weight percentages of materials:

| | Percent |
|---|---|
| Fe (83% $Fe_2O_3$) | 58 |
| P (56% $P_2O_5$) | 24 |
| V (9% $V_2O_5$) | 5 |
| Si (7% $SiO_2$) | 3 |
| Cr (6% $Cr_2O_3$) | 4 |

The resulting sintered product was removed from the furnace, cooled, and the porosity of the material was found to be 9% by volume as measured by mercury displacement. A portion of the product was ground to −100 mesh size and found to have the following analysis:

| | Pecent by wt. |
|---|---|
| $SiO_2$ | 2.3 |
| $Fe_2O_3$ | 3.9 |
| CaO | 1.3 |
| $P_2O_5$ | 1.8 |
| MgO (by difference) | 90.7 |

Run B.—Prior art process

The above process was repeated with a second sample except that the iron was supplied by using a pyrite cinder essentially $Fe_2O_3$. The final periclase product contained by weight 2.8% $SiO_2$, 4.2% $Fe_2O_3$, 1.8% CaO, 0.10% $P_2O_5$, 91.1% MgO (by difference) and had a porosity of 17% by volume.

Pursuant to the requirements of the patent statutes, the principle of this invention has been explained and exemplified in a manner so that it can be readily practiced by those skilled in the art, such exemplifications including what is considered to represent the best embodiment of the invention. However, it should be clearly understood that, within the scope of the appended claims, the invention may be practiced by those skilled in the art, and having the benefit of this disclosure otherwise than as specifically described and exemplified herein.

What is claimed is:

1. A fired refractory product consisting essentially of magnesium oxide in amounts of from about 80% to about 95% by weight, silica in amounts of from about 1% to about 6% by weight, phosphorus in amounts of from about 0.5 to about 5% by weight, expressed as $P_2O_5$, and iron in amounts of from about 1% to about 6% by weight, expressed as iron oxide, said iron and phosphorus being derived from a ferrophosphorus fraction from a phosphorus-producing electric furnace.

2. The refractory composition of claim 1 wherein said ferrophosphorus fraction comprises about 50% to about 70% by weight iron and about 19% to about 29% phosphorus.

3. The refractory composition of claim 1 wherein said magnesium oxide is brine derived.

4. The refractory composition of claim 1 wherein said magnesium oxide is derived from magnesite.

5. Process of producing a refractory composition comprising blending together a member selected from the group consisting of magnesium oxide and magnesium hydroxide, with silica, phosphorus and iron, said phosphorus and iron being added to said refractory composition in the form of a ferrophosphorus fraction derived from a phosphorus-producing electric furnace, and heating said composition to temperatures from about 1600° to 1900° C., and recovering a refractory composition containing from about 80% to 95% by weight MgO, about 1% to 6% by weight silica, about 0.5% to 5% phosphorus, expressed as $P_2O_5$, and about 1% to 6% by weight iron, expressed as iron oxide.

6. Process of claim 5 wherein the refractory composition contains, by weight, from about 80% to 95% MgO, about 1.5% to about 4.5% iron, expressed as $Fe_2O_3$, about 1.5% to about 4.5% $SiO_2$ and about 0.5% to about 5% $P_2O_5$, and the Fe/P ratio is at least 2.29.

7. Process of claim 5 wherein the refractory composition contains, by weight, about 89% to about 92% MgO, about 3.3% to about 3.8% iron, expressed as $Fe_2O_3$, about 2.2% to about 2.7% $SiO_2$ and about 2.0% to about 2.5% $P_2O_5$.

8. Process of claim 5 wherein magnesium oxide derived from magnesite is used in preparing said refractory composition.

9. Process of claim 5 wherein said member selected from the group consisting of magnesium oxide and magnesium hydroxide is brine derived.

References Cited

UNITED STATES PATENTS

| | | | |
|---|---|---|---|
| 2,229,297 | 1/1941 | Lee | 106—60 |
| 2,695,242 | 11/1954 | Woodward | 106—58 |

JAMES E. POER, *Primary Examiner.*

U.S. DEPARTMENT OF COMMERCE
PATENT OFFICE
Washington, D.C. 20231

UNITED STATES PATENT OFFICE
CERTIFICATE OF CORRECTION

Patent No. 3,404,016                                              October 1, 1968

Henry L. Marschall

It is certified that error appears in the above identified patent and that said Letters Patent are hereby corrected as shown below:

Column 4, line 39, "2.5% $SiO_2$" should read -- 3.5% $SiO_2$ --. Column 5, line 1, before "The" insert -- Run B-Prior Art Process --; line 13, "2,2%" should read -- 2.2% --; line 72, "The" should read -- Ten --. Column 6, line 15, "Pecent" should read -- Percent --.

Signed and sealed this 24th day of February 1970.

(SEAL)
Attest:

Edward M. Fletcher, Jr.                          WILLIAM E. SCHUYLER, JR.
Attesting Officer                                          Commissioner of Patents